Feb. 8, 1938. P. HALLOT 2,107,823
BRAKING SYSTEM
Filed July 13 1934 3 Sheets-Sheet 1

INVENTOR
Paul Hallot
BY
Stone, Boyden & Mack
ATTORNEYS

Feb. 8, 1938.   P. HALLOT   2,107,823
BRAKING SYSTEM
Filed July 13 1934   3 Sheets-Sheet 2
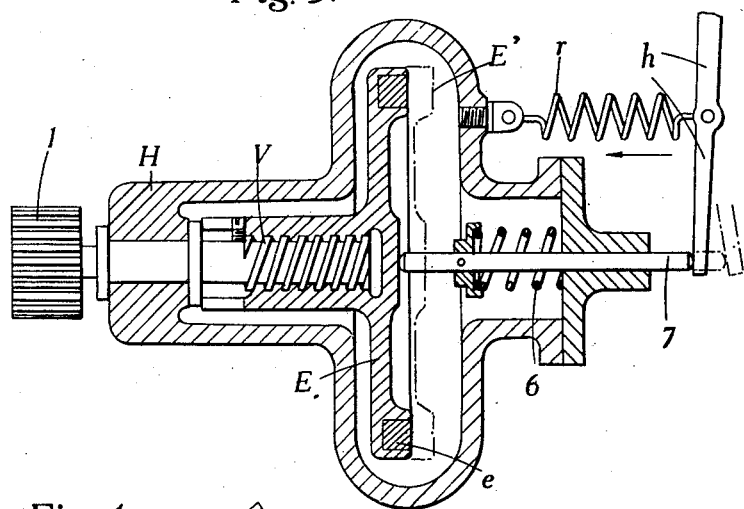
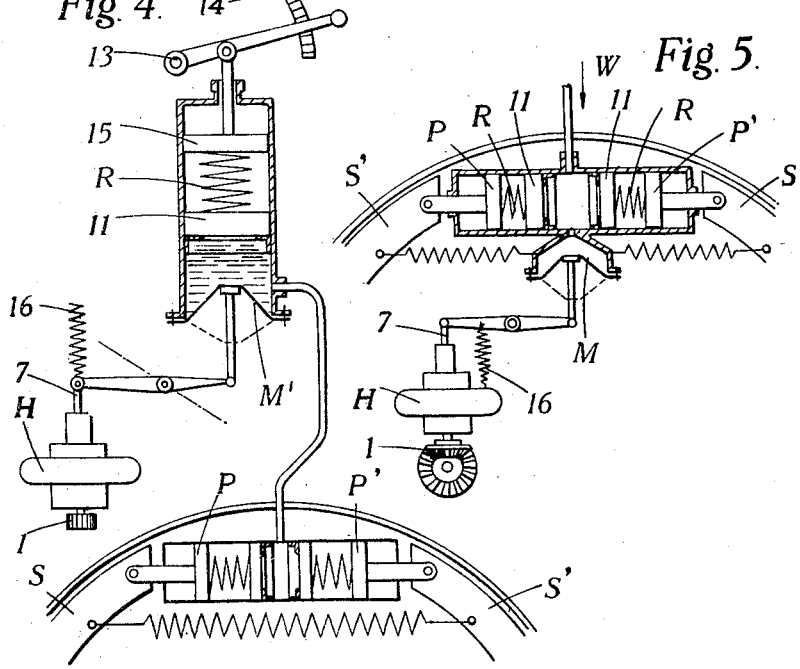

Feb. 8, 1938. P. HALLOT 2,107,823
BRAKING SYSTEM
Filed July 13, 1934 3 Sheets-Sheet 3
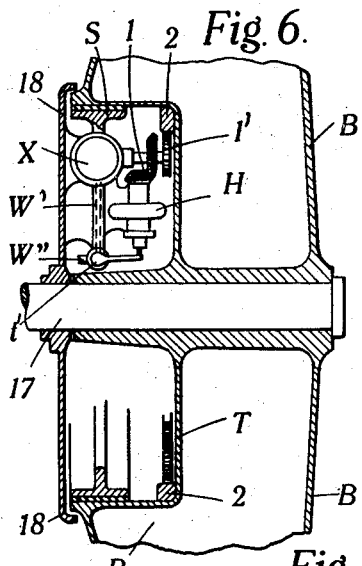
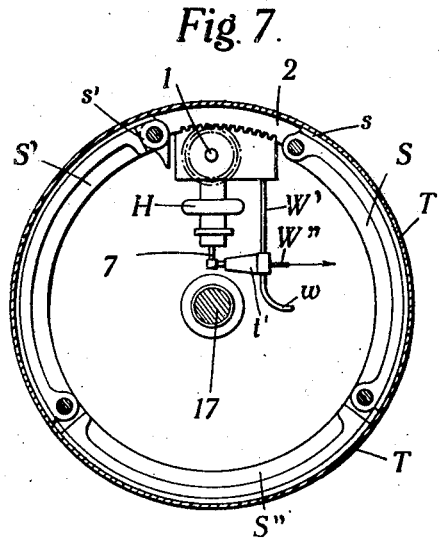
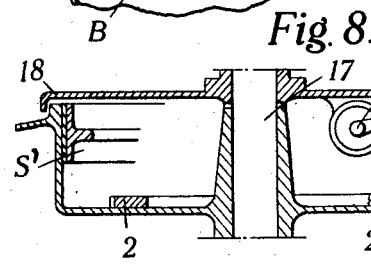
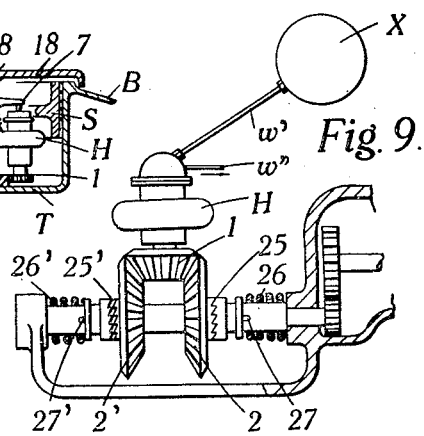
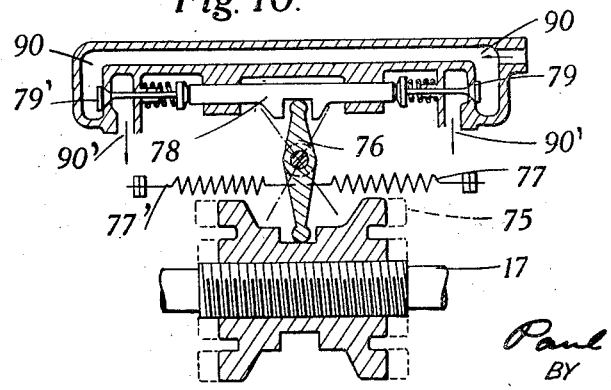
INVENTOR.
Paul Hallot.
BY
Stone, Boyden & Mack
ATTORNEYS Patented Feb. 8, 1938

2,107,823

UNITED STATES PATENT OFFICE 2,107,823

BRAKING SYSTEM

Paul Hallot, Paris, France

Application July 13, 1934, Serial No. 735,082
In France July 13, 1933

7 Claims. (Cl. 188—181)

The present invention relates to hydraulic brakes for wheels of all types of vehicles, for example, aeroplanes, automobiles, railway trains and the like and has for its object to provide a system wherein if the wheels are too highly braked their jamming is automatically prevented.

The invention will be described with reference to the accompanying drawings in which Fig. 1 shows a general arrangement according to the invention.

Fig. 3 shows a cross section through one form of self-regulating device according to the invention.

Fig. 4 shows an alternative form of the invention.

Fig. 5 shows a modification of Fig. 4.

Figs. 6, 7, and 8 show methods of arranging the self-regulating device within the brake drum of a vehicle wheel.

Fig. 9 shows an arrangement for operating the self-regulating device irrespective of the direction of rotation of the wheels.

Fig. 10 shows a modified construction of self-regulating device operating irrespective of the direction of rotation of the wheels.

Figure 1:
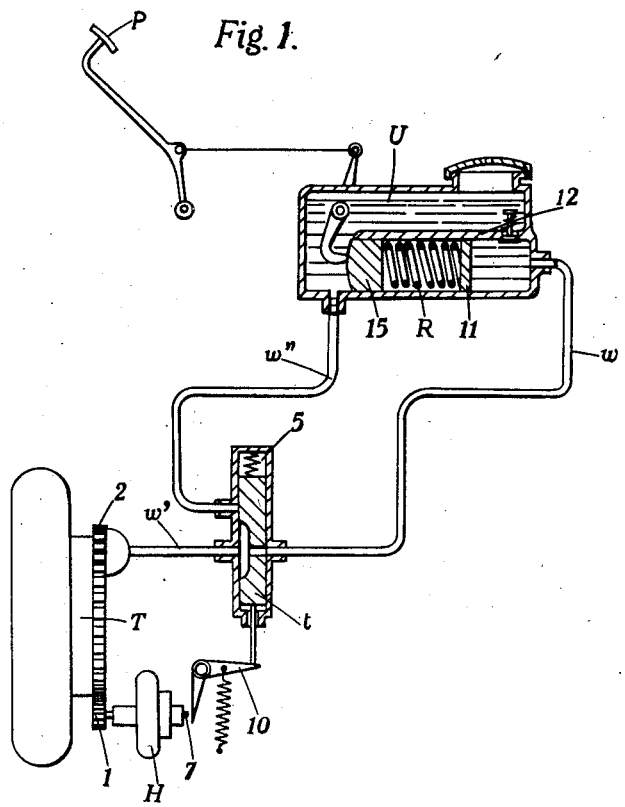

Referring to Fig. 1 the brake pedal P operates a piston 15 which reacts through a compensating spring R on a movable piston 11. The pistons 15 and 11 operate in a cylinder 12 housed in a reservoir U, a suitable valve being provided to enable oil in the reservoir U to pass to the pressure side of the piston 11. The piston 11 transmits the oil by way of pipes w, w' to the brake operating mechanism arranged in the brake drum T of the wheel. According to the invention the pipes w, w' connect with the wheel through a slide valve t provided with a by-pass pipe w'' communicating with the reservoir U for permitting the oil to leak back to the container c when the slide valve is moved upwards.

This slide valve is controlled by a self-regulator H which is driven by a pinion I geared with a crown wheel 2 coupled to the wheel.

One form of construction of the self-regulator H is shown in Fig. 3 and comprises a casing in which is rotatably mounted a screw threaded member V driven by the pinion I. Freely mounted on the screw is an internally threaded fly-wheel member E which is rapidly rotated by the screw V when the wheels are in rotation. If, however, by too strong a braking action there is a sudden reduction in the speed preceding the locking of the wheels the fly-wheel E is displaced by inertia to the position E' shown in dotted lines. This action moves a push rod 7 slidably mounted in the casing and pressed by a spring 6 into engagement with the fly-wheel to operate a lever h against the action of the spring r. The movement of h moves the arm 10 (Fig. 1) thus moving the slide valve t upwards and connecting the pipe w' with the by-pass w'' thus permitting the oil in the brake mechanism in the wheel drum to leak back to the container U thereby reducing the braking pressure and giving to the wheel again its normal rotation. This fresh movement of the wheel causes the fly-wheel E to again be wound on to the screw V and thus moved towards the left, the slide valve t then moving downwards under the action of the spring 5.

The fly-wheel E may be fitted with removable heavy blocks e of known weight in order to adjust the action of the self-regulator.

It will be understood that when the slide valve t moves downwards the oil in the pipe w must be forced into the brake cylinder in order to apply a reduced braking pressure. This is effected by the strong compensating spring R which is under compression and moves the piston 11 as soon as communication between the pipe w and the brake cylinder is established through the slide valve t. The compensating spring R acts continuously as long as it is compressed by the piston 15 and also acts freely, that is, its action is entirely independent of the action of the self-regulating device. If the wheel speed is again suddenly reduced preceding jamming, the self-regulator H again operates and a still further reduced braking pressure is applied. In this way the brakes are applied with the maximum pressure permitted by the particular conditions of friction which exist. It is known that the optimum braking pressure cannot be determined for all variations of friction otherwise than by a self-regulating device as forms a characteristic feature of this invention.

Figure 2:
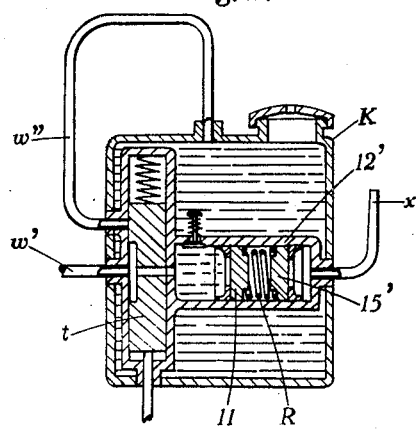
Fig. 2 shows a modification of part of Fig. 1.

Fig. 2 shows a modified arrangement which may be used in combination with any existing hydraulic braking system without it being necessary to modify the usual piston operated by the brake pedal or lever. The usual piston (not shown) transmits oil by way of the pipe x to a cylinder 12' housed in a casing K forming an oil reservoir. In the cylinder 12' are arranged a piston 15', the strong compensating compression spring R and the piston 11. The cylinder 12' is integral with the housing of the slide valve t which is also arranged in the casing K. With this arrangement, which operates similarly to the arrangement illustrated in Fig. 1 when the slide valve $t$ moves to permit by-passing of the brake operating oil, the latter is returned to the casing K by way of the pipe $w''$.

Fig. 4 shows a modified construction in which the operation of the self-regulator H operates merely to reduce the oil pressure and not to leak any of the oil back to the storage chamber. In this figure the brake lever or pedal 13 moving against a segment 14 operates piston 15, and through the compensating spring R the further piston 11 which acts on the oil column. The oil pressure is fed to the operating cylinder in the brake drum and moves the pistons $p$ and $p'$ to operate the brake segments S, and S'. The self-regulator H is again driven by a pinion 1 from a suitable gear wheel driven from the wheel being braked, (for example from a crown wheel as shown in Fig. 1), and on sudden reduction of speed preceding jamming moves the push rod 7 and acts upon the membrane M' temporarily increasing the cylinder volume in order to reduce the hydraulic pressure transferred to the brake cylinder. The pressure applied to the brake cylinder is compensated by the expansion of the spring R. When the wheel again begins rotating the membrane M' again moves upwards under the action of the spring 16 which is more powerful than spring R to reduce the cylinder volume and increase the braking pressure. The braking pressure is thus adjusted, in accordance with the reduction in speed of the wheels without any loss of liquid, to the maximum permissible braking pressure.

Fig. 5 shows a modified construction in which the membrane M is arranged directly against the brake cylinder arranged in the brake drum. The spring R in conjunction with the piston 11 again automatically compensates for the variation in volume and adjusts the braking pressure accordingly. In this arrangement the gear 1 (shown as a bevel wheel) of the self-regulator H may be driven through gearing from a crown wheel mounted inside the brake drum as shown for example in Fig. 6.

A feature of the invention consists in arranging an independent self-regulator in each wheel brake drum which thus operates in accordance with the particular requirements of each vehicle wheel or axle. Various methods of arranging the self-regulator device within the brake drum are shown in Figs. 6, 7, and 8.

In Figs. 6 and 7 the brake drum T carries an internally toothed crown wheel 2 which engages with a pinion 1' carried by a spindle rotatably mounted in a projection from the brake cylinder X. Cast integral with the brake cylinder X is a bracket for carrying the self-regulator H which is driven from the shaft carrying the pinion 1' through bevel gears 1. The brake cylinder X is carried from a cover plate 18 secured to the fixed axle 17 of the wheel B. In the arrangement shown the self-regulator controls a rotary valve $t'$ having ports therein which connects the pipe $w'$ leading to the brake cylinder with the supply pipe $w$ or the by-pass pipe $w''$ in exactly the same manner as the slide valve $t$ described with reference to Fig. 1. Fig. 7 shows a side view of the arrangement which shows three brake shoes S, S', S'' which are lined with brake lining $s, s'$.

Fig. 8 shows an alternative method of mounting the self-regulator H which is driven through the pinion 1 from a smaller crown wheel 2 mounted within the brake drum T. The self-regulator H is carried from the cover plate 18 and operates the valve 8 through its control rod 7 to control the flow of fluid in a manner similar to that described with reference to Figs. 6 and 7.

The self-regulators above described only operate in one direction of rotation and in order to make them suitable for operation irrespective of the direction of rotation of the wheel they may be driven by a mechanism as illustrated in Fig. 9. This mechanism comprises two ratchet couplings 25, 25' held in engagement by springs 26, 26' respectively. The spring pressed portions of the ratchet couplings are longitudinally movable along but not rotatable about the spindle on which they are carried, pin and slot connections 27, 27' respectively being provided for this purpose. When the spindle is rotated one of the ratchets drives the bevel gears 2, 2' whilst the other free-wheels in a manner which will be obvious from the drawings. The bevel gear 1 coupled to the shaft of the self-regulator H is thus driven in the same direction irrespective of the direction of rotation of the wheels.

The shaft carrying the ratchet couplings may be driven through gearing coupled to any suitable rotating part of the wheel or axle, and in the figure the valve mechanism controlling the flow of oil in the pipes $w'$ and $w''$ to the brake cylinder X is mounted integral with the self-regulator H.

An alternative construction with the same end is shown in Fig. 10 in which the self-regulator comprises a heavy threaded fly-wheel 75 mounted on a screw threaded portion forming part of the wheel axle 17. Due to the inertia of the fly-wheel it will move to the dotted position shown towards the right or the left depending upon the direction of rotation of the axle and thus operates a pivoted lever 76 which in turn controls valves 79, 79', through the push rod 78. The lever 76 is normally held in neutral position by two opposing springs 77, 77'. The braking pressure existing in the chamber 90 which connects with the brake cylinder may thus be released through the outlet 90' connected to the by-pass $w''$ to reduce the braking action, the valves again closing when the speed of the axle increases.

I claim:—

1. A braking system for vehicle wheels, comprising an operating member, a compensating spring which is adapted to be compressed by movement of said operating member, a piston on which said spring presses, hydraulic transmission means for transmitting the movement of said piston to braking mechanism associated with a wheel to be braked, and a self-regulating device operated by said wheel and operating on a sudden reduction in speed to reduce the braking pressure applied to the wheels.

2. A braking system for vehicle wheels, comprising an operating member, a piston moved by said member, hydraulic transmission means for transmitting the movement of said piston to brake mechanism associated with a wheel to be braked, a self-regulating device driven by said wheel for reducing the braking pressure if the wheel is too highly braked, and compensating spring means adapted to act upon the hydraulic transmission means freely and continuously throughout the period of the braking operation, said spring means preventing reduction in pressure below the maximum value which can be applied to the braking mechanism without locking the wheels.

3. A braking system for vehicle wheels, comprising an operating member, a piston moved by said member, hydraulic transmission means for transmitting the movement of the piston to braking mechanism associated with a wheel to be braked, a screw threaded member rotated by the movement of said wheel, a fly-wheel mounted on said screw threaded member and movable longitudinally by inertia on a sudden change in speed of the wheel, means operated by the movement of said fly-wheel to reduce the braking pressure when the wheel speed is suddenly reduced, and compensating spring means acting upon the hydraulic transmission means irrespectively of the longitudinal position of the fly-wheel for maintaining the pressure at the maximum value which can be applied to the braking mechanism without locking the vehicle wheels.

4. A braking system for vehicle wheels, comprising an operating member, a compensating spring which is adapted to be compressed by movement of said member, a piston on which said spring presses, a hydraulic transmission passage for transmitting the movement of said piston to brake mechanism associated with a wheel to be braked, a self-regulating device driven by said wheel, and means operated by the self-regulating device for increasing the capacity of the hydraulic transmission passage on a sudden reduction in speed of the wheel.

5. A braking system for vehicle wheels, comprising an operating member, a piston moved by said member, a hydraulic transmission passage for transmitting the movement of said piston to brake mechanism associated with a wheel to be braked, a self-regulating device driven by said wheel, means operated by the self-regulating device for increasing the capacity of the hydraulic transmission passage on a sudden reduction in speed of the wheel, and compensating spring means adapted to act upon the hydraulic transmission means freely and continuously throughout the period of the braking operation, said spring means preventing reduction in pressure below the maximum value which can be applied to the braking mechanism without locking the wheels.

6. A hydraulic braking system for vehicle wheels, comprising a plurality of wheels to be braked, hydraulic braking mechanism associated with each of said wheels, an independent self-regulating device associated with each of said wheels for automatically reducing the hydraulic braking action of its associated brake should the wheel be too highly braked, and compensating spring means associated with each of said hydraulic braking mechanisms and independent of said self-regulating devices for preventing reduction of the hydraulic braking action below the maximum value which can be applied to the wheels without locking the same.

7. A braking system for vehicle wheels, comprising an operating member, a piston moved by said member, hydraulic fluid for transmitting the movement of said piston to brake mechanism associated with a wheel to be braked, a compensating spring compressed by the movement of said piston, a second piston on which the spring bears, said second piston thereby being pressed on the hydraulic fluid, and a self-regulating device operated in accordance with the reduction of the speed of the wheel to by-pass a proportion of the hydraulic fluid under pressure if the wheel is too highly braked.

PAUL HALLOT.